United States Patent
Goodman et al.

(10) Patent No.: US 7,099,306 B2
(45) Date of Patent: Aug. 29, 2006

(54) SYSTEM AND METHOD FOR INTERNET PROTOCOL TELEPHONY ADVERTISEMENT PROTOCOL

(75) Inventors: Lee Goodman, Tyngsboro, MA (US); Eric Doiron, Cambridge, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 148 days.

(21) Appl. No.: 10/414,825

(22) Filed: Apr. 16, 2003

(65) Prior Publication Data

US 2004/0208185 A1 Oct. 21, 2004

(51) Int. Cl.
*H04L 12/66* (2006.01)
*H04L 12/28* (2006.01)

(52) U.S. Cl. .................. 370/352; 370/389
(58) Field of Classification Search ........ 370/352–356, 370/389, 390, 392, 400, 401, 475, 432, 911; 379/88.17, 210.01, 900; 709/204
See application file for complete search history.

(56) References Cited

U.S. PATENT DOCUMENTS

| | | | |
|---|---|---|---|
| 6,069,890 A * | 5/2000 | White et al. ............... 370/352 |
| 6,275,574 B1 * | 8/2001 | Oran ...................... 379/201.01 |
| 6,636,594 B1 * | 10/2003 | Oran ...................... 379/201.01 |
| 6,785,234 B1 * | 8/2004 | Pruski ........................ 370/231 |
| 6,788,675 B1 * | 9/2004 | Yang .......................... 370/352 |
| 6,795,429 B1 * | 9/2004 | Schuster et al. ............ 370/352 |
| 6,798,767 B1 * | 9/2004 | Alexander et al. .......... 370/352 |
| 6,798,768 B1 * | 9/2004 | Gallick et al. .............. 370/352 |
| 7,006,455 B1 * | 2/2006 | Fandrianto et al. ......... 370/260 |
| 2001/0005366 A1 * | 6/2001 | Kobayashi .................. 370/352 |
| 2002/0041588 A1 * | 4/2002 | Gleneck ..................... 370/352 |
| 2002/0105946 A1 * | 8/2002 | Takeuchi .................... 370/352 |
| 2002/0131575 A1 * | 9/2002 | Gallant .................. 379/220.01 |
| 2003/0095542 A1 * | 5/2003 | Chang et al. ............... 370/352 |
| 2004/0165579 A1 * | 8/2004 | Mandle ...................... 370/352 |

* cited by examiner

*Primary Examiner*—Chau Nguyen
*Assistant Examiner*—Hong Sol Cho
(74) *Attorney, Agent, or Firm*—Faegre & Benson LLP

(57) ABSTRACT

The present invention provides a system and method that provides for call completion of VoIP telephone calls. The method of the present invention comprises receiving a telephony advertisement packet comprising addressing information and storing the telephony advertisement packet. The stored telephony advertisement packet is used to complete a call.

32 Claims, 6 Drawing Sheets

SYSTEM AND METHOD FOR INTERNET PROTOCOL TELEPHONY ADVERTISEMENT PROTOCOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to facilitating electronic communications. More particularly, the present invention relates to systems and method for allowing a plurality of IP telephony devices to communicate with each other without requiring the use of a telephony gateway or similar call set up service.

Many modern corporate telecommunications systems implement what is referred to as a private branch exchange or PBX. An organization implements a PBX system, typically comprising various hardware and software components, to switch calls between organization users on a series of internal lines, each terminating at the PBX. The PBX switches calls between these internal users over the local lines, thereby eliminating the need for calls to connect over external lines to a switch on the Public Switched Telephone Network (PSTN), e.g., over a plurality of locals loops connected to a switch that the Local Exchange Carrier (LEC) maintains.

The PBX, in addition to connecting users within an organization over a plurality of local lines, is connected to a LEC via one or more external lines. Most modem digital PBX systems utilize software to multiplex a number of calls from internal users to destinations outside the organization over significantly fewer external lines. For example, one or two digital Ti lines may provide sufficient bandwidth to carry the voice and data traffic for an organization of several hundred employees. Organizations realize significant financial gains from using the PBX through elimination of the need to maintain a line for each user in the organization to the telephone company's central office.

In IP telephony networks that provide Voice over IP (VoIP) communications, an IP telephony gateway is attached to the organization's PBX system. The gateway is also attached to an IP network over which it communicates with IP telephony devices, such as an IP telephone handset. The gateway receives the voice data (which may or may not be digitized), significantly compresses it, encodes the data as 1P packets for transport over the network and routes it to a destination, e.g., another IP telephony device on the gateway's local network or to the PBX to transport over the public switched telephone network (PSTN). The gateway also provides translation between communication protocols or formats, as well as call setup and cleanup on both its LAN and switched circuit interfaces.

Because IP telephony devices are typically "dumb" devices, they are unable to send or receive calls to or from PBX based telephone or telephones otherwise connected to the PSTN without the presence of a gateway on the LAN to which the IP telephony device connects. Moreover, the IP telephony devices will not be able to communicate with other IP telephony devices on the local network as the telephony gateway provides address resolution functionality, e.g., between a SIP URL and IP address. Thus, systems and methods are required that that provide PBX functionality on an IP telephony network, e.g., routing calls between local IP telephony devices, in the event that a network's gateway or similar call setup service fails.

BRIEF SUMMARY OF THE INVENTION

The system and method of the present invention, which may be embodied in various combinations of inter operating hardware and software components, provides a mechanism for facilitating to completion of VoIP calls over a local network without requiring the use of a gateway of similar call setup service to perform address resolution and call completion. One embodiment of the method of Lhe present invention comprises receiving a telephony advertisement packet comprising addressing information and storing the telephony advertisement packet. The stored telephony advertisement packet is used to complete the call. When the call cannot be completed by utilizing the stored telephony advertisement packet, telephony gateway may be accessed to complete the call.

Storing the telephony advertisement packer comprises storing the telephony advertisement packet in a dynamic dial plan, which comprises a data store configured to store one or more of the telephony advertisement packers from one or more telephony devices on the network. Storing the telephony advertisement packet may comprise storing an E.164 address in the dynamic dial plan of a telephony device that receives the telephony advertisement packet. Storing the telephony advertisement packer may also comprise storing an IP address in the dynamic dial plan of a telephony device that receives the telephony advertisement.

According to one embodiment of the invention, the method comprises receiving a sequence number with the telephony advertisement packet. In most situations, a telephony device receives receiving a plurality of telephony advertisement packets from a given telephony device on the network. To maintain only the most recent telephony advertisement packet from a given telephony device, the method comprises storing the telephony advertisement packet with a sequence number indicating that it is the most recent telephony advertisement packet from the given telephony device.

The method may also comprise recording receipt parameter information for each received telephony advertisement packet. Where the receipt parameter information indicates that a telephony advertisement packet has exceeded an aging threshold, the telephony advertisement packet is deleted.

An alternative method for providing call completion of VoIP telephone calls comprises storing a plurality of telephony advertisement packets from a plurality of telephony devices on a network in a dynamic dial plan. A call destination is received from a user, which is used to query the dynamic dial plan to determine the network address of the call destination. The network address, which may be returned by or retrieved from the dynamic dial plan, is utilized to complete the call.

The present invention also contemplates a system for providing call completion of VoIP telephone calls. The system of the present invention comprises a dynamic dial plan comprising address information for one or more telephony devices on a network. VoIP software is configured to query the dynamic dial plan based on a call destination provided by a user, retrieve a network address of the call destination, and complete a call to the network address.

Address information in the dynamic dial plan may comprise one or more telephony advertisement packets transmitted from the one or more telephony devices on the network. A telephony advertisement packet may comprise a call destination and an associated network address. According to one embodiment, the call destination comprises an E.164 address and the network address comprises an IP address. A sequence number may also be included as part of the telephony advertisement packet wherein the sequence number identifies the most recent telephony advertisement packet received from one of the one or more telephony devices.

Receipt parameter information may also be associated with each telephony advertisement packet and stored in the dynamic dial plan. The receipt parameter information may be utilized to determine if a given telephony advertisement packet has exceeded an aging threshold indicating that the telephony advertisement packet should be deleted.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
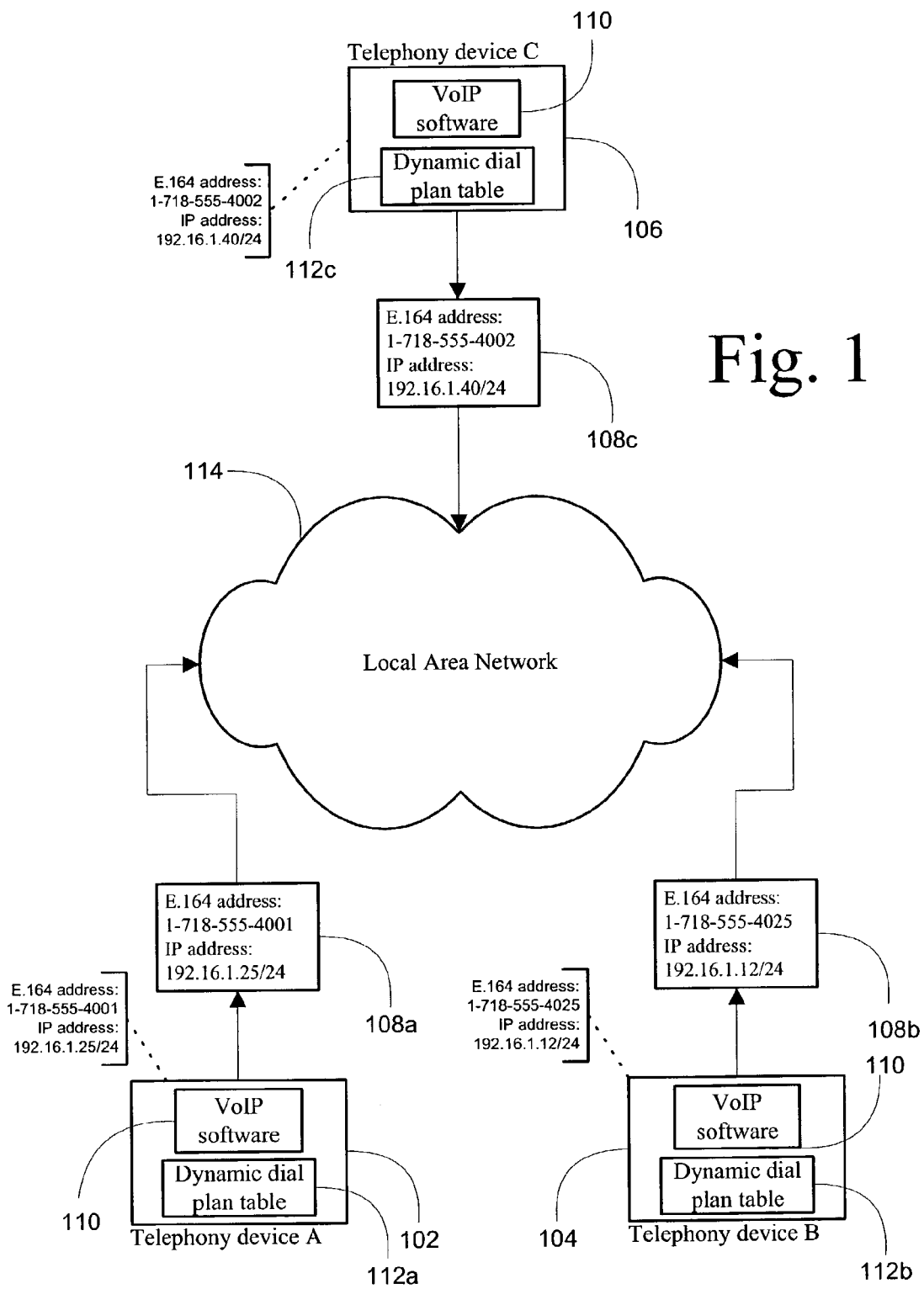
FIG. 1 is a block diagram presenting a configuration of hardware and software components according to one embodiment of the present invention.

With reference to FIGS. 1 through 6, embodiments of the invention are presented. FIG. 1 presents one configuration of the hardware and software components involved in performing address translation and call completion between IP telephony devices on a local network without the use of an IP telephony gateway or similar call setup service.

A network 114, such as a local or wide area network, provides communication pathways that allow a plurality of telephony devices 102, 104 and 106 to exchange data. When attempting to place a call from one device to another, e.g., a call between telephony devices A and B, 102 and 104, respectively, a gateway (not pictured) is typically used to provide each telephony device with knowledge regarding the location or address of the destination device, as well as other telephony devices on the network. For example, where a user of telephony device A 102 enters the address 1-718-555-4025, the gateway performs address translation to identify the destination as telephony device B, which is located on the network 114 at IP address 192.16.1.12/24. The gateway may then route the communications traffic to the appropriate network destination to thereby complete the call.

In order to allow telephony devices 102, 104 and 106 on a local network to complete calls without the use of a gateway, each device must be provided with a minimum amount of knowledge regarding other devices on the network 114 to determine the appropriate destination address to which as call should be directed. Each telephony device 102, 104 and 106 is responsible for providing this information to other telephony devices on the network, which is achieved through the transmission of telephony advertisement packets 108a, 108b and 108c. Each telephony device 102, 104 and 106 propagates its telephony advertisement packets to other telephony devices on the network 114. The propagation of telephony advertisement packets 108a, 108b and 108c may be accomplished by VoIP software 110 operating on the telephony device or by a software module specifically dedicated to this purpose. According to various embodiments of the invention, the telephony advertisement packets 108a, 108b and 108c, may be propagated using broadcast or multicast techniques on a defined UDP port to which each telephony device 102, 104 and 106 configured to listen. Furthermore, a user or administrator may configure the specific port to which the telephony device listens.

The telephony advertisement packets 108a, 108b and 108c, each comprise addressing information for the telephony device from which it is being sent. For example, telephony device A 102 sends a telephony address packet 108a comprising the device's E.164 address and it's IP address on the network 114. It should be noted, however, that the addressing schemes implemented by the telephony devices 102, 104 and 106, is not limited to E.164 or IP addressing, other addressing schemes, e.g., a combination of SIP and IPX addressing, are contemplated for use with the invention and may easily be implemented in conjunction with the present invention by one skilled in the art.

Each telephony device 102, 104 and 106 receives telephony advertisement packets from other telephony devices on the network 114 to build a dynamic dial plan 112a, 112b and 112c, concerning other telephony devices. As a telephony device receives telephony advertisement packets, they are stored in its dynamic dial plan to provide the device with knowledge regarding the addresses of other telephony devices on the network 114. The dynamic dial plan 112a, 112b and 112c may comprise any type of data store known to those of skill in the art including, but not limited to, flat file data structures, such as tab or comma delimited data files, relational databases, object-oriented databases, hybrid object-relational databases, etc. Table 1 presents an exemplary dynamic dial plan maintained by telephony device A 102 that comprises data from telephony advertisement packets that the telephony device 102 receives from other telephony devices, 104 and 106, on the network 114.

TABLE 1

| Telephony device A dynamic dial plan |
| --- |
| Telephony device B:<br>E. 164 address: 1-718-555-4025<br>IP address: 192.16.1.12/24<br>Telephony device C:<br>E. 164 address: 1-718-555-4002<br>IP address: 192.16.1.40/24 |

The telephony devices 102, 104 and 106, also comprise VoIP software 110 that allows the telephony device to initiate VoIP calls to other telephony devices, including both packet based IP telephony equipment and traditional switch based telephone equipment connected to the PSTN. When a user attempts to use the VoIP software 110 to place a call, the VoIP software typically requests signaling services and address translation from a telephony gateway located on the network 114.

Where the VoIP software 110 is unable to initiate a connection with a gateway, however, the software attempts to determine if the call is being placed to a telephony device connected to the network 114. The VoIP software 110 uses the destination address that the user provides to query the telephony device's dynamic dial plan 112a, 112b and 112c, to determine if the address is contained therein. Where the dynamic dial plan 112a, 112b and 112c comprises information regarding the destination address, the VoIP software 110 uses the information to properly route the call to its intended destination. For example, assume that a user at telephony device A 102 attempts to initiate a call to telephony device B 106 by providing an E.164 address of 718-555-4025. The VoIP software 110 operating on telephony device A 102 queries its dynamic dial plan 112a to determine that the IP address associated with the supplied E.164 address is 192.16.1.12/24. The VoIP software 110 uses this address to route the call to the intended destination, e.g., telephony device B 106.

The system of the present invention provides numerous advantages in addition providing calling functionality in the event of an IP telephony gateway failure. For example, because each IP telephony device 102, 104 and 106 is provided with information that allows it to directly connect to other IP telephony devices, bandwidth consumption on the organization's access circuit may be reduced or eliminated when making intra-organization calls. Furthermore, because the IP telephony devices 102, 104 and 106 locally configure themselves by building a dynamic dial plan, intra-organization dialing integrity is restored upon movement or relocation of the IP telephony device once the device's dynamic dial plan converges.

Figure 2:
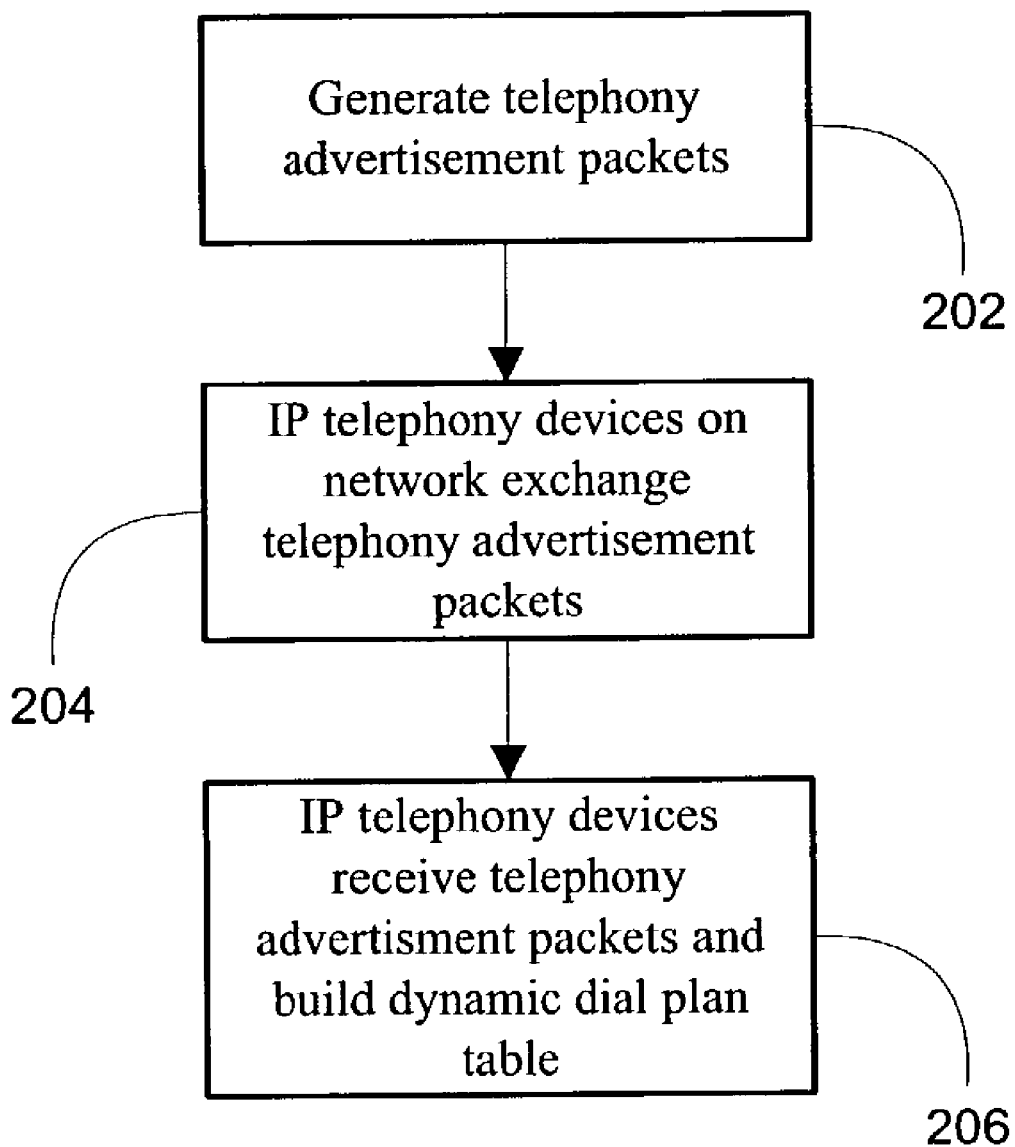
FIG. 2 is a block diagram presenting a method for creating a dynamic dial plan according to one embodiment of the invention.

FIG. 2 presents one embodiment of a method for creating a dynamical dial plan for use by the telephony devices introduced in FIG. 1. Each telephony device connected to the network generates telephony advertisement packets at regular intervals, step 202. A user may determine the time interval over which telephony advertisement packets are generated through an interface to the VoIP software or software component responsible for generating the packets. Alternatively, a network administrator responsible for maintaining IP telephony functionality on the network may globally or individually set the packet generation interval. Each of the telephony advertisement packets comprises the phone's identifier, e.g., E.164 or SIP address, and network address, e.g., IP address.

IP telephony devices on the network exchange telephony advertisement packets amongst each other to provide each IP telephony device with addressing information for other devices on the network, step 204. The telephony advertisement packets may be exchanged over the network to other IP telephony devices using TCP/IP on a defined UDP port. According to one embodiment of the invention, the telephony advertisement packets are broadcast over the network to other IP telephony devices. Broadcast techniques, however, only allow telephony advertisement packets to be propagated to other IP telephony devices attached to the same physical network segment. Alternative embodiments of the invention therefore contemplate the use of multicast techniques that allow the telephony advertisement packets to be propagated to all users on a local network, including IP telephony devices that reside on different physical network segments interconnected by a router or hub.

Each IP telephony device receives telephony advertisement packets from other IP telephony devices on the network, which are used to build a dynamic dial plan on each device, step 206. Accordingly, as telephony advertisement packets are received at an IP telephony device, the data contained in each telephony advertisement packet is entered the into the device's dynamic dial plan, which may be a database or similar data store. As is explained in greater detail herein, as subsequent telephony advertisement packets are received from a given IP telephony device, previous addressing data from older telephony advertisement packets is discarded and replaced with the most recent information.

Figure 3:
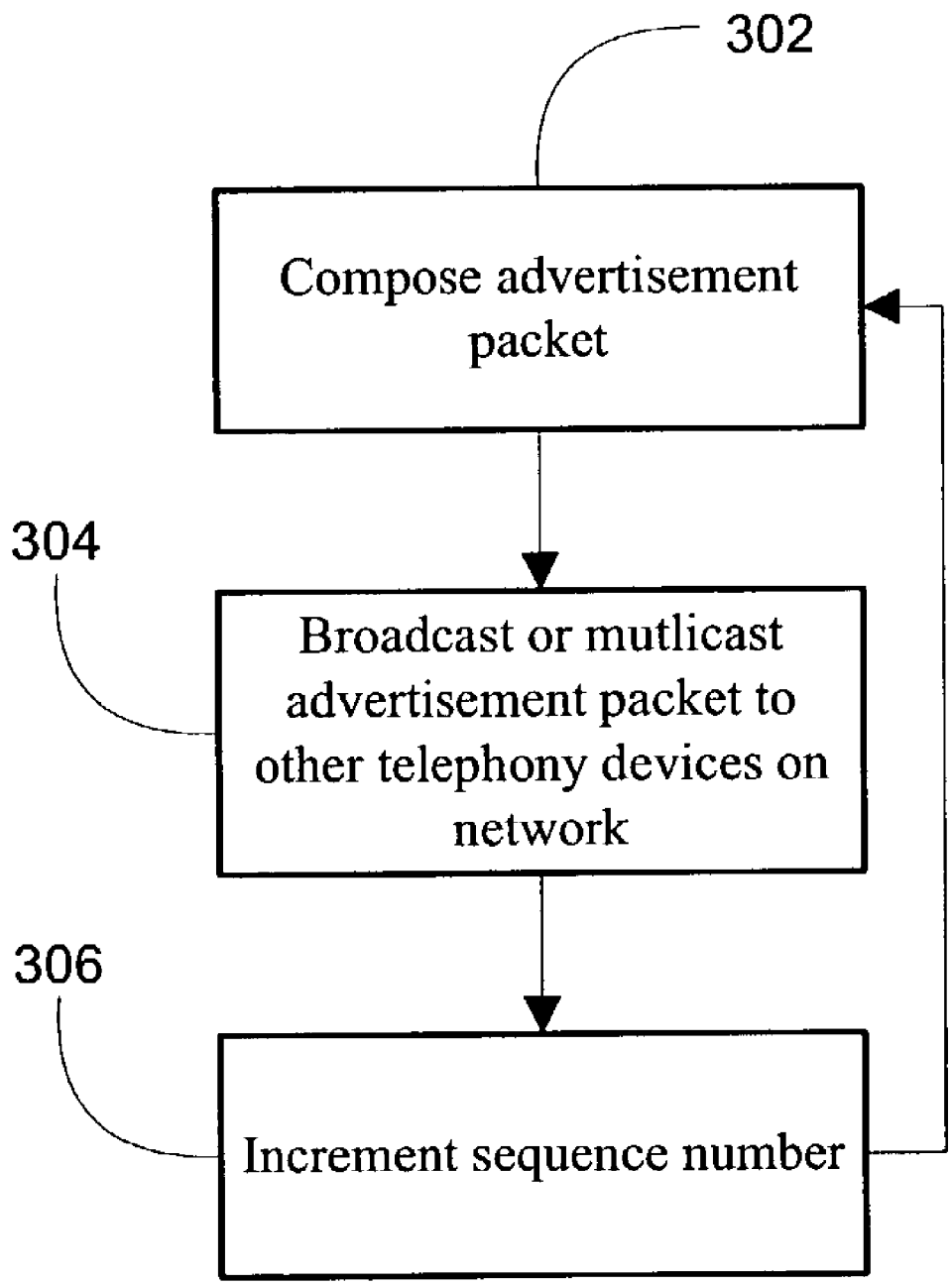
FIG. 3 is a flow diagram presenting a method for composing and transmitting telephony advertisement packets according to one embodiment of the present invention.

The telephony advertisement packet generation process introduced in FIGS. 1 and 2 is explained in greater detail in FIG. 3. A given IP telephony device on the network composes or generates a telephony advertisement packet, step 302. As previously explained, the telephony advertisement packet comprises addressing information for the given IP telephony device, such as an E.164 address and corresponding IP address. Additionally, the telephony advertisement packet preferably comprises a sequence number or identifier. The sequence number allows other IP telephony devices that receive a plurality of telephony advertisement packets from the given IP telephony device to determine which of the plurality of packets comprises the most up to date information. By comparing the sequence identifiers of a plurality of telephony advertisement packets from a given source, an IP telephony device may discard stale telephony advertisement packets, as described in greater detail herein.

The given IP telephony device propagates its telephony advertisement packets over the network, which other IP telephony devices on the network receive, step 304. According to various embodiments of the invention, the given IP telephony device may utilize broadcast or multicast techniques to transmit the telephony advertisement packets, which other IP telephony devices receive on a defined UDP port.

After a regular interval has passed, which may be set by the user or IP telephony administrator responsible for the network, the sequence number maintained by the IP telephony device is incremented, step 306. The sequence number is preferably a numeric identifier, although according to some embodiments it may comprise an alphanumeric identifier. IP telephony devices that receive the telephony advertisement packets utilize the sequence number to determine which one of a plurality of telephony advertisement packets received from a given IP telephony device is most recent and should therefore be recorded in its dynamic dial plan. Also, when an IP telephony device receives a telephony advertisement packet from a given IP telephony device, the sequence number in the telephony advertisement packet may be compared against the data for the given IP telephony device stored in its dynamic dial plan to determine if the data in the received telephony advertisement packet should replace data it is maintaining in its dynamic dial plan.

Figure 4:
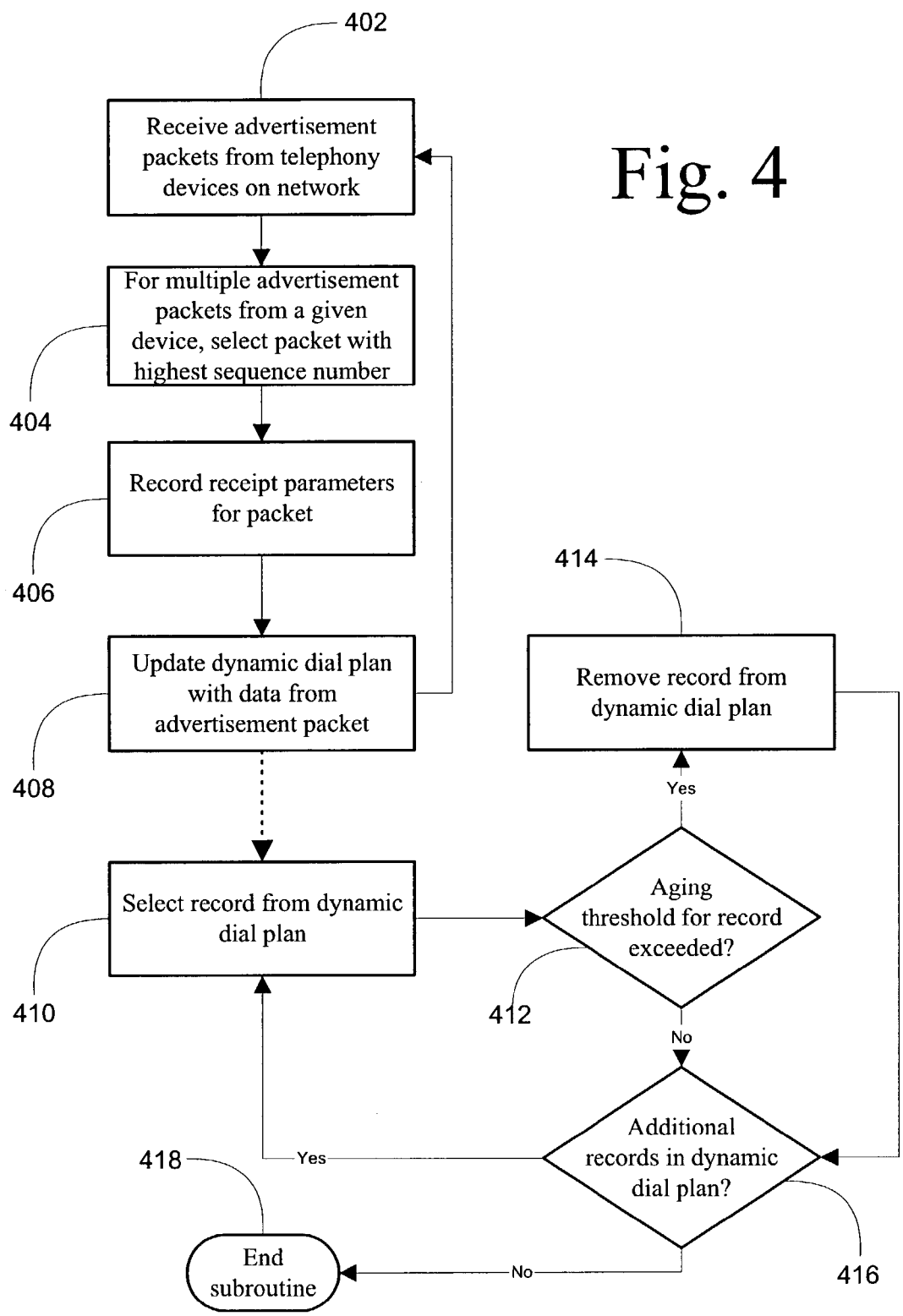
FIG. 4 is a flow diagram presenting a method for receiving and storing telephony advertisement packets according to one embodiment of the present invention.

FIG. 4 builds on the process of receiving and storing telephony advertisement packets illustrated in FIG. 2. The process begins when an IP telephony device receives a telephony advertisement packet from another IP telephony device on the network, step 402. Where an IP telephony device receives multiple telephony advertisement packets from a given IP telephony device, the device selects the telephony advertisement packet with a sequence number indicating that it is the most recent telephony advertisement packet, step 404. The most recent telephony advertisement packet is selected and its receipt parameters recorded in the dynamic dial plan, step 406. The IP telephony device maintains the receipt parameters to calculate aging of records or entries in the dynamic dial plan. At step 408, the dynamic dial plan is updated to reflect the addressing data contained in the telephony advertisement packet selected at step 404. Processing returns to step 402 where the IP telephony device awaits the next telephony advertisement packet.

Software operating on the IP telephony device, e.g., one or more VoIP software or related components, must periodically execute a subroutine to traverse the dynamic dial plan and purge stale entries, e.g., IP telephony devices that exceed a threshold without transmitting a subsequent telephony advertisement packet. A record is selected from the dynamic dialing plan, step 410. Logically, the first record in the dynamic dialing is preferably selected when the subroutine begins.

A record is retrieved from the dynamic dial plan, step 410, and a check is performed to determine if the record has exceeded a set aging threshold, step 412. The aging threshold, which may alternatively be set by the user or administrator of the IP telephony network, represents a window in which a given record in the dynamic dial plan is considered to be reliable. Once the aging threshold is exceeded, the record is considered stale and therefore unreliable. If the check performed at step 412 evaluates to true, e.g., the current record has exceed the aging threshold, the record is removed from the dynamic dial plan, step 414. Where the current record has not exceeded the aging threshold, step 412, a check is performed to determine if additional records are present in the dynamic dial plan that require analysis, step 416. Where additional records are present, the next record in the dynamic dial plan is selected, step 410, otherwise the subroutine ends, step 418. It should be recognized by one skilled in the art that the subroutine encompassing steps 410, 412, 414, 416 and 418 may be executed on a periodic basis, which a user or administrator may configure.

Figure 5:
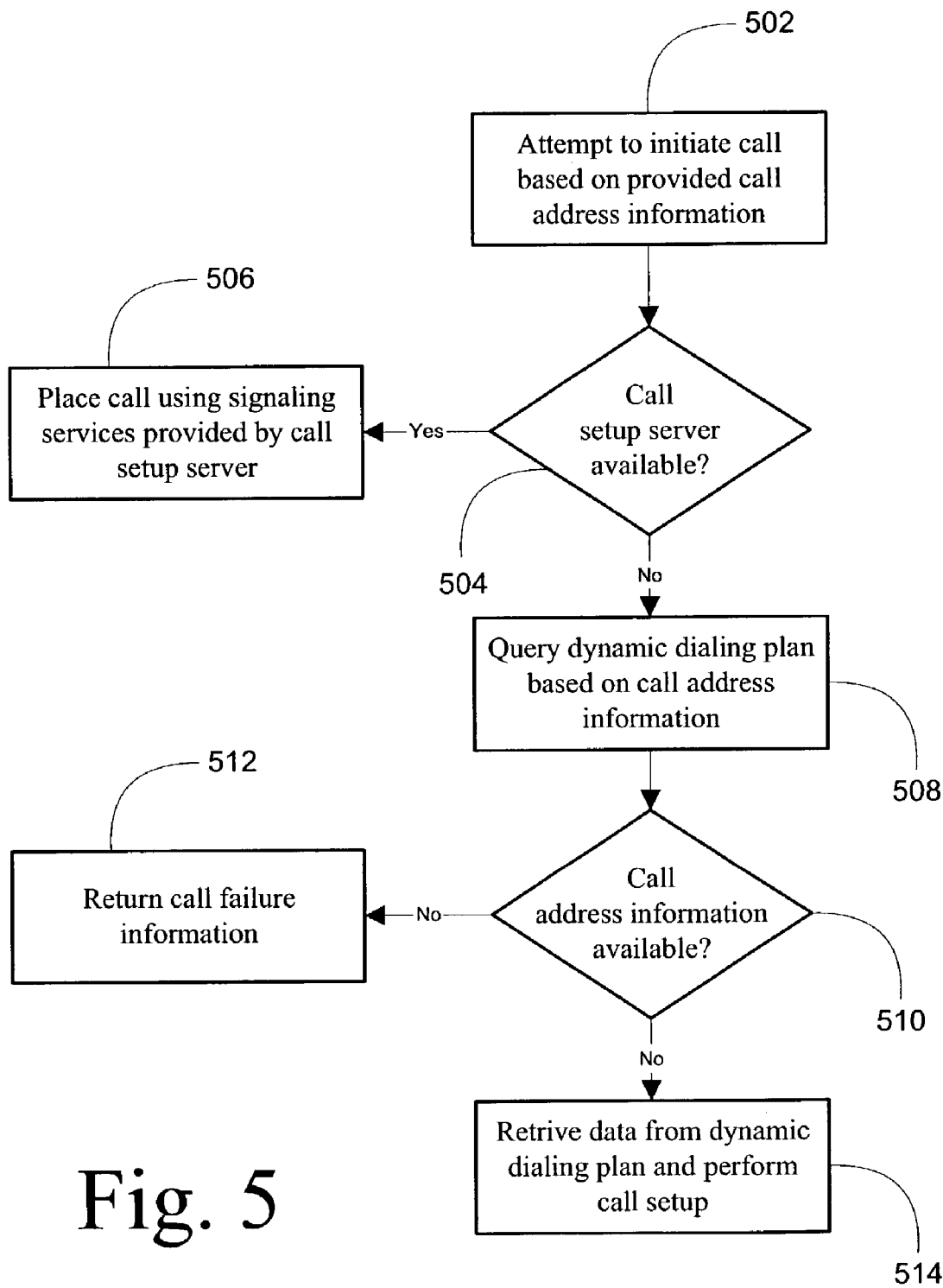
FIG. 5 is a flow diagram presenting a method for executing a call using the stored telephony advertisement packets according to one embodiment of the present invention.

Referring to FIG. 5, one embodiment of a method for operating the system presented in FIG. 1 is illustrated. Using the interface provided for accessing the VoIP software, e.g., one or more VoIP software components interacting with an operation system, a user attempts to initiate a call, step 502. The call attempt is based on call address information, such as an E.164 address or a SIP URL. To place the call, the VoIP sends a request over the network to an IP telephony gateway or similar service to perform call setup and address resolution. A check is performed to determine if the telephony gateway is available, step 504. Where the telephony gateway is available, the VoIP software utilizes the signaling services that the telephony gateway provides to place the call, step 506.

Where the call setup server or IP telephony gateway is unavailable, step 504, the VoIP software queries the dynamic dial plan based on the call address information that the user supplies, step 508. The query may comprise any format that the dynamical dial plan supports. For example, where the dynamic dial plan is a relational database, the VoIP software may issue a SQL query based on the call address information. A check is performed to determine if the dynamic dial plan comprises the address information that the user supplies, step 510. For example, where the user supplies a SIP URL, the query determines if IP address information associated with the supplied SIP URL is in the dynamic dial plan. Where the dynamic dial plan does not comprise the address information, step 510, a call failure message is returned to the VoIP software, step 512, which may optionally be presented to the user. If, however, the address information is in the dynamic dial plan, step 510, the data is returned from the dynamic dial plan, which is used by the VoIP software to initiate the call, step 514.

Figure 6:
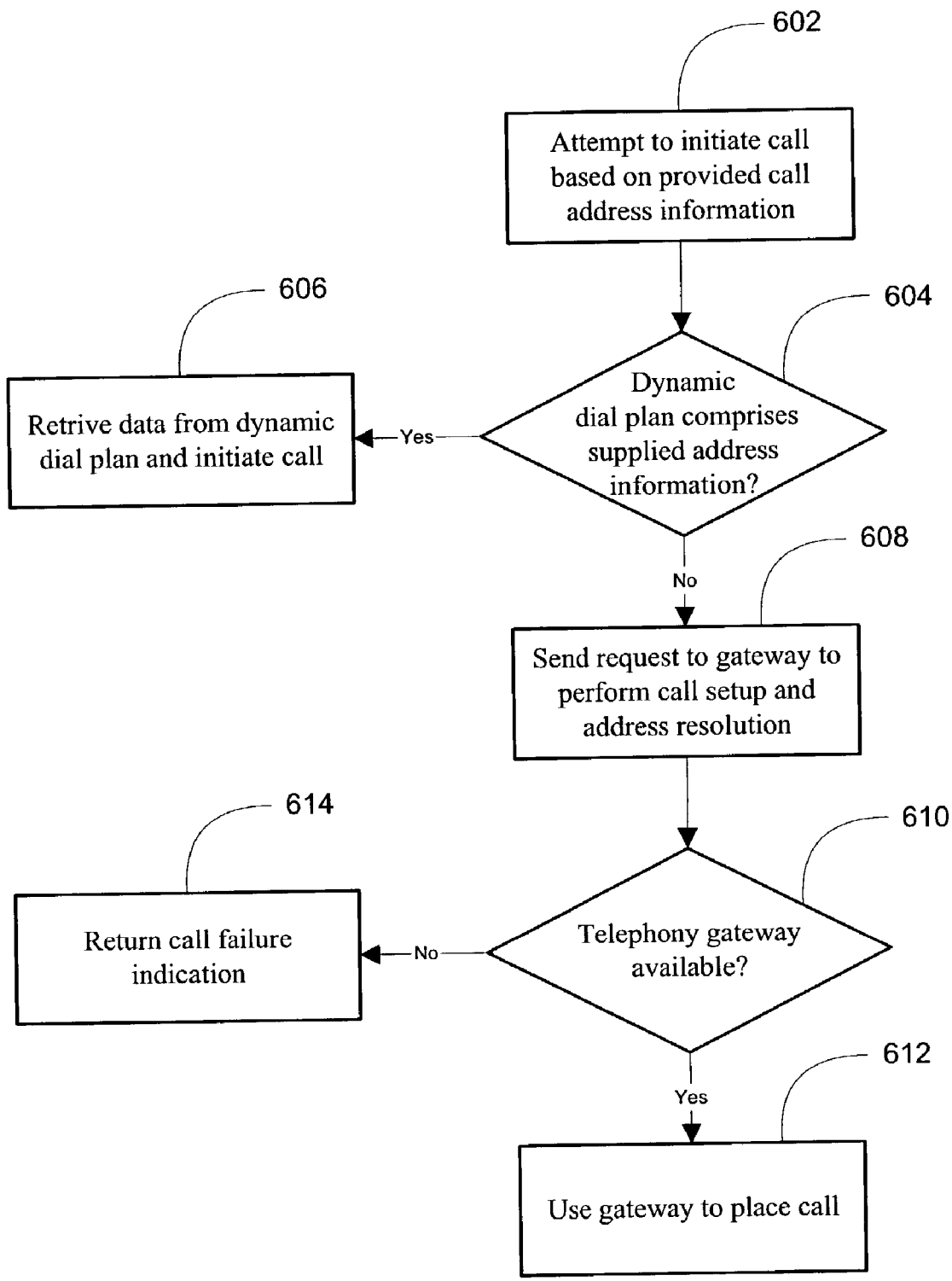
FIG. 6 is a flow diagram presenting a method for executing a call using the stored telephony advertisement packets according to one embodiment of the present invention.

FIG. 6 presents an alternative embodiment of a method for operating the system presented in FIG. 1. Using the interface provided for accessing the VoIP software, e.g., one or more VoIP software components interacting with an operating system, a user attempts to initiate a call, step 602. The call attempt is based on call address information, such as an E.164 address or a SIP URL. A check is performed to determine if the dynamic dial plan comprises the address information that the user supplies, step 604. For example, where the user supplies a SIP URL, the query determines if IP address information associated with the supplied SIP URL is in the dynamic dial plan. If the address information is in the dynamic dial plan, step 604, the data is returned from the dynamic dial plan, which is used by the VoIP software to initiate the call, step 606. In this manner, all calls to IP telephony terminals located on the originating terminal's network are not routed through the IP telephony gateway and always remain on the local network.

Where the dynamic dial plan does not comprise the address information, step 604, the VoIP sends a request over the network to an IP telephony gateway or similar service to perform call setup and address resolution, step 608. A check is performed to determine if the telephony gateway is available, step 610. Where the telephony gateway is available, the VoIP software utilizes the signaling services that the telephony gateway provides to place the call, step 612. If, however, the address information is not in the dynamic dial plan and the IP telephony gateway is unavailable, a call failure message is returned to the VoIP software, step 614, which may optionally be presented to the user.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing call completion of VoIP telephone calls, the method comprising:
    a first internet protocol (IP) telephony device receiving a telephony advertisement packet directly from a second IP telephony device, the telephony advertisement packet comprising addressing information of the second IP telephony device;
    the first IP telephony device storing the telephony advertisement packet; and
    when the first IP telephony device initiates a voice over IP (VoIP) telephone call to the second IF telephony device, the first IP telephony device utilizing the stored telephony advertisement packet to complete the VoIP telephone call.

2. The method of claim 1, wherein storing the telephony advertisement packet comprises storing the telephony advertisement packet in a dynamic dial plan of the first IP telephony device.

3. The method of claim 2, wherein storing the telephony advertisement packet comprises storing an E.164 address of the second IP telephony device in the dynamic dial plan.

4. The method of claim 3, wherein storing the telephony advertisement packet comprises storing an IP address of the second IP telephony device in the dynamic dial plan.

5. The method of claim 1, wherein said receiving comprises receiving a sequence number with the telephony advertisement packet.

6. The method of claim 1, further comprising:
receiving a plurality of telephony advertisement packets from a given telephony device; and
storing the plurality of telephony advertisement packets with a sequence number indicating the most recent telephony advertisement packet of the plurality of telephony advertisement packets.

7. The method of claim 1, further comprising recording receipt parameters for the telephony advertisement packet.

8. The method of claim 7, further comprising deleting the telephony advertisement packet when the receipt parameters indicate that an aging threshold is exceeded.

9. The method of claim 1, further comprising accessing a telephony gateway when the call cannot be completed by utilizing the stored telephony advertisement packet.

10. The method of claim 1, wherein at least one of the first and second IP telephony devices comprises an IP phone.

11. A method for providing call completion of voice over internet protocol (VoIP) telephone calls, the method comprising:
storing in a direct dial plan contained in memory of a first IP telephony device, a plurality of network addresses of a plurality of internet protocol (IP) telephony devices, the plurality of network addresses received within a plurality of telephony advertisement packets sent directly from the corresponding IP telephony devices;
receiving a call destination from a user of the first IP telephony device, the call destination corresponding to a second IP telephony device of the plurality of IP telephony devices;
querying the dynamic dial plan to determine a network address of the call destination; and
utilizing the network address to complete a call from the first IP telephony device to the second IP telephony device.

12. The method of claim 11, further comprising transmitting a telephony advertisement packet from each of the plurality of IP telephony devices at a periodic interval.

13. The method of claim 12, further comprising incrementing a sequence number associated with the telephony advertisement packet.

14. A system for providing call completion of voice over internet protocol (VoIP) telephone calls, the system comprising:
a dynamic dial plan associated with a first internet protocol (IP) telephony device, the dynamic dial plan comprising address information for one or more other IP telephony devices on a network, the address information provided directly to the first IP telephony device by the one or more other IP telephony devices; and
VoIP software configured to query the dynamic dial plan based on a call destination provided by a user of the first IP telephony device, retrieve a network address corresponding to the call destination, and complete a call to the network address.

15. The system of claim 14, further comprising a telephony advertisement packet transmitted from the one or more telephony devices on the network, the telephony advertisement packets stored in the dynamic dial plan.

16. The system of claim 15 wherein the telephony advertisement packet comprises a call destination and an associated network address.

17. The system of claim 16 wherein the call destination comprises an E.164 address and the network address comprises an IP address.

18. The system of claim 15 wherein the telephony advertisement packet comprises a sequence number.

19. The system of claim 18 wherein the sequence number identifies the most recent telephony advertisement packet received from one of the one or more telephony devices.

20. The system of claim 15, further comprising receipt parameter information associated with each telephony advertisement packet.

21. The system of claim 20 wherein the receipt parameter information is stored in the dynamic dial plan.

22. The system of claim 20 wherein the receipt parameter information is utilized to determine if a given telephony advertisement packet has exceeded an aging threshold indicating that the telephony advertisement packet should be deleted.

23. A method for advertising address information comprising:
a first internet protocol (IP) telephony device generating an advertisement message containing addressing information for the first IP telephony device;
the first IP telephony device transmitting the advertisement message to one or more other IP telephony devices; and
responsive to receiving the advertisement message, the one or more other IP telephony devices storing the addressing information of the first IP telephony device in associated databases, wherein each of the one or more other IP telephony devices can retrieve the addressing information without utilizing a network gateway to resolve addressing information of the first IP telephony device.

24. The method of claim 23 wherein the first IP telephony device comprises an IP telephone.

25. The method of claim 24 further comprising an IP telephone of the one or more other IP telephony devices utilizing the stored addressing information to complete a voice over internet protocol (VoIP) telephone call to the first IP telephony device.

26. The method of claim 25, further comprising accessing a telephony gateway when the VoIP call cannot be completed by utilizing the stored addressing information.

27. The method of claim 23, further comprising storing an E.164 address of the first IP telephony device in a dynamic dial plan.

28. The method of claim 27 comprising storing an IP address of the first IP telephony device in the dynamic dial plan.

29. The method of claim 23, wherein the advertisement message includes a sequence number.

30. The method of claim 23, further comprising recording receipt parameters for the addressing information.

31. The method of claim 30, further comprising deleting the addressing information when the receipt parameters indicate that an aging threshold is exceeded.

32. A system comprising:
a plurality of internet protocol (IP) telephony devices;
a first group of one or more IP telephony devices of the plurality of IP telephony devices configured to generate advertisement messages containing addressing information and transmit to one or more other IP telephony devices of the plurality of IP telephony devices the advertisement messages; and a second group of one or more IP telephony devices of the plurality of IP telephony devices configured to receive advertisement messages, store the addressing information, and initiate calls to the first group of one or more IP telephony devices by utilizing the stored addressing information, without accessing a network gateway resource to determine addressing information of the first group of one or more IP telephony devices.

* * * * *